United States Patent
Stockhammer

(10) Patent No.: US 6,896,187 B2
(45) Date of Patent: May 24, 2005

(54) READER DEVICE FOR BAR-CODED AUTHORIZATION CARDS

(75) Inventor: Rudolf Stockhammer, Gilgen (AU)

(73) Assignee: Skidata AG, Gartenau (AT)

( * ) Notice: Subject to any disclaimer, the term of this patent is extended or adjusted under 35 U.S.C. 154(b) by 11 days.

(21) Appl. No.: 10/344,327

(22) PCT Filed: Jul. 26, 2001

(86) PCT No.: PCT/EP01/08682
§ 371 (c)(1),
(2), (4) Date: Feb. 7, 2003

(87) PCT Pub. No.: WO02/13130
PCT Pub. Date: Feb. 14, 2002

(65) Prior Publication Data
US 2004/0026513 A1 Feb. 12, 2004

(30) Foreign Application Priority Data
Aug. 7, 2000 (DE) .......................... 100 38 470

(51) Int. Cl.$^7$ ................................. G06K 7/10
(52) U.S. Cl. ............. 235/462.14; 235/454; 235/462.01; 235/462.43; 235/439
(58) Field of Search ...................... 235/462.01–462.49, 235/454, 465, 439, 468

(56) References Cited

U.S. PATENT DOCUMENTS

| | | |
|---|---|---|
| 4,939,355 A | 7/1990 | Rando et al. |
| 5,053,612 A | 10/1991 | Pielemeier et al. |
| 5,422,744 A | 6/1995 | Katz et al. |
| 5,536,924 A | 7/1996 | Ackley |
| 5,627,356 A | 5/1997 | Takemoto et al. |
| 5,661,289 A * | 8/1997 | Sasou et al. ................. 235/449 |
| 5,777,314 A | 7/1998 | Roustaei |
| 5,939,699 A | 8/1999 | Perttunen et al. |
| 6,062,473 A * | 5/2000 | Blalock et al. .............. 235/381 |
| 6,119,943 A * | 9/2000 | Christy ....................... 235/468 |
| 6,616,043 B2 * | 9/2003 | Zazzu et al. ............ 235/462.01 |

FOREIGN PATENT DOCUMENTS

| | | |
|---|---|---|
| DE | 3910633 A | 10/1990 |
| DE | 4319555 A1 | 12/1994 |
| DE | 29516201 U | 11/1996 |
| EP | 0446164 A | 9/1991 |
| EP | 0571259 A | 11/1993 |
| EP | 0607444 A | 7/1994 |
| EP | 0663643 A | 7/1995 |
| JP | 7-131645 | 5/1995 |
| WO | WO 8905498 A | 6/1989 |

* cited by examiner

Primary Examiner—Michael G. Lee
Assistant Examiner—Jamara A. Franklin
(74) Attorney, Agent, or Firm—Flynn, Thiel, Boutell & Tanis, PC

(57) ABSTRACT

An apparatus for reading authorization cards with a bar code has a housing with an insertion slot for inserting the card and at least one reading head in the housing for scanning the bar code in a line perpendicular to the insertion direction of the card. The space in the housing is formed to be so long that the card is insertable further beyond the scan line of the reading head by a path (d) that is greater than the distance (c') between the leading edge of the card and the end of the bar code field facing away from the leading edge. This permits reading of cards with different lengths (a) and different positions (c') of the bar code field.

13 Claims, 2 Drawing Sheets

READER DEVICE FOR BAR-CODED AUTHORIZATION CARDS

FIELD OF THE INVENTION

This invention relates to an apparatus for reading authorization cards with a bar code having a housing, a slot-shaped insertion opening into an interior space for inserting the card and a reading head for scanning the bar code in a line perpendicular to the insertion direction of the card.

BACKGROUND OF THE INVENTION

Such card reading apparatuses have been known for some time. They are chiefly used in access control systems that generally have a person singling device, such as a turnstile, that is actuated or unblocked by the reading apparatus when the card reader scans a corresponding bar code. The card is inserted through the insertion slot as far as a stop in the housing, the reading head being so disposed in the housing that its scan line scans the bar code when the card reaches the stop. That is, the distance between the scan line of the reading head and the stop corresponds to the distance between the leading edge of the card and the bar code field running across the card. After scanning, the card is removed and, for example, access enabled if the bar code is valid.

The reading head scanning the bar code in a line perpendicular to the card insertion direction can be for example a CCD (charged coupled device) line sensor that extends across the inserted card and receives the light reflected by the bar code and emitted by a light source, for example LEDs (light emitting diodes).

A large number of authorization cards, for example for sports or recreational events, are issued by different card issuing offices in decentralized fashion. The individual card issuing offices frequently have different printers or attach importance to their own special card design. Accordingly, bar code authorization cards that differ distinctly in format and in the position of the bar code field are frequently used for the same event.

To permit cards with different formats and positions of the bar code to be read, omnidirectional bar code readers have been used as are found at supermarket and department store cash registers. The card is placed on a transparent plate to illuminate the bar code and detect it with a laser beam independently of direction.

Although most people are used to inserting authorization cards into a reader with a slot-shaped insertion opening, for example for cancellation, checking their validity and utilizing a service, they are usually not familiar with using such omnidirectional bar code readers. Omnidirectional card bar code readers can therefore lead to considerable jams at the access control systems in particular for mass events.

U.S. Pat. No. 6,062,473 discloses a reading apparatus according to one embodiment. The card is inserted into the insertion opening widthwise. Reading of the card is effected after the stop is reached. To permit the card to be inserted so far, a thumb indentation is provided at the insertion opening. An omnidirectional bar code reader permits reading of cards with different positions of the bar code field as well as other bar code documents, which are placed for this purpose in a cavity under the insertion slot.

According to EP-A-0446164, the bar code field is read in the longitudinal direction. According to U.S. Pat. No. 5,422,744, the bar code card is pulled through a channel having a CCD sensor. According to EP-A-0607444, a bar code card is supplied through an insertion slot with transport rolls to a reader, an erase section and a recording station. U.S. Pat. No. 5,777,314, U.S. Pat. No. 5,053,612, U.S. Pat. No. 5,939,699 and JP-A-07131645 disclose bar code readers with which the bar code is exposed to light and evaluated by a line CCD sensor.

BRIEF SUMMARY OF THE INVENTION

A purpose of the invention is to provide a simply constructed reading apparatus for bar code cards with different formats and positions of the bar code field that is easy and fast to operate for everyone.

According to one embodiment of the invention, the interior space in the housing of the reader into which the card is inserted through the insertion slot is formed to be so long that the card is insertable further beyond the scan line of the reading head by a path that is greater than the distance between the leading edge of the card and the end of the bar code field facing away from the leading edge.

Scanning of the bar code with the reading head is thus effected during insertion, i.e. during motion of the card, which is inserted in the longitudinal direction.

To permit reading of cards in which the bar code is provided at a greater distance from the leading edge, the reading head is disposed in the housing at the insertion slot, i.e. as close as possible behind the insertion slot, preferably so that the distance of the scan line of the reading head from the insertion slot is at most four times, preferably at most two times, in particular at most the length of the bar code field in the insertion direction.

So that the scan line of the reading head extends as close as possible behind the insertion slot, the reading head can be disposed obliquely, e.g. so that the light beams are reflected by the scan line, i.e. the bar code on the card, obliquely rearward, i.e. away from the insertion slot toward the optoelectric transducer of the reading head.

To permit the widest cards to be inserted, the insertion opening and the guide of the card within the housing are formed so as to be accordingly wide. The guideway can extend straight, but optionally also be curved.

The inventive apparatus can thus read all card formats also of different width from the ISO ticket to the IATA ticket.

When inserted, the card is firstly guided through the insertion slot. For further guidance and thus definition of the motion path of the card, the housing can then be provided with different devices, for example one or two guide grooves that receive one or both longitudinal edges of the card.

The reading head of the inventive apparatus that scans the bar code in a line perpendicular to the card insertion direction can have as an optoelectric transducer a CCD line sensor, which extends across the card and receives the light reflected by the bar code and emitted by a light source, for example LEDs. The incoherent light of the light source or LEDs falls on the card as a line extending perpendicular to the insertion direction.

Authorization cards can have a bar code that can be scanned optically in the visible region, or a bar code scannable in the infrared region, which cannot be duplicated unauthorized e.g. with a copying machine, unlike a bar code scannable in the visible region.

To permit optical scanning of both cards with a bar code in the visible region and cards with a bar code in the infrared region, the inventive apparatus preferably has two reading heads tandem mounted in the insertion direction for optical scanning in the visible and IR regions, respectively.

The reading head for the visible region and/or the reading head for the IR region can be disposed both on one side of the card guide, e.g. above. It is furthermore possible to additionally dispose one or more reading heads for the IR and/or visible region on the other side of the card guide, e.g. below, to permit cards inserted the wrong way round to be read. Should it be impossible for reasons of space to install further reading heads on the other side of or below the card guide, this function can also be obtained by a mirror disposed on the other side of or below the card guide for deflecting the light to the reading head or heads disposed on one side of, e.g. above, the guide.

Since bar codes scannable in the visible region occur more frequently on authorization cards than bar codes scannable with IR light, the reading head for scanning in the visible region is disposed before the reading head for scanning in the IR region.

Each reading head scans a single line on the particular side of the card. The scan line of the reading head scanning with visible light and the scan line of the reading head scanning with IR light can be a small distance apart, which is preferably smaller than the length of the bar code field in the insertion direction. However, the distance of said two scan lines can also be greater, e.g. if a bar code for IR light and a bar code for visible light are provided on the card at a distance apart. The width of each scan line is many times, at least three times, smaller than the length of the bar code field in the insertion direction.

Instead of one reading head for visible light and one for IR light, only one reading head can be provided that scans the bar code with both visible and IR light. The visible light and IR light of said reading head can be deflected by the mirror disposed on the other side.

The inventive apparatus can further have a stop extending perpendicular to the insertion direction in the interior space of the housing. Said stop is sufficiently far away from the insertion slot to ensure that even the bar code on the longest card to be inserted can be read by the reading head during the motion upon insertion of the card into the interior space or removal of the card from the interior space. That is, the distance between the stop and the scan line of the reading head is greater than the distance between the leading edge of the card and the end of the bar code field facing away from the leading edge. The stop serves the purpose of aligning a card straight when it has been inserted into the insertion slot obliquely so that it cannot, or not completely, be detected by the scan line of the reading head.

To restrict the on-time of the reading head to the scanning process, a sensor, for example a light barrier, is preferably provided between insertion slot and scan line of the reading head for detecting the inserted leading edge of the card and thus switching the reading head on upon insertion of the card and off upon removal of the card.

When cards are issued in decentralized fashion, a certain bar code, i.e. a certain number, might be granted twice. Accordingly, the invention preferably provides a sensor, e.g. a light barrier, that detects the width of the card. The width of the card can thus be used as an authorization criterion in addition to the bar code upon checking of the card.

The inventive apparatus for reading an authorization card with a bar code can also have a sensor for detecting biometric identification features (e.g. fingerprint, iris, subcutaneous blood vessels), further a memory for storing the authorized person's biometric identification features and a device for comparing the stored with the detected biometric identification features.

Furthermore, the inventive apparatus can have a reading and/or writing device for an RFID data carrier, whereby the latter can be formed by a wristwatch with an integrated transponder or by an authorization card having a transponder besides the bar code.

Moreover, the inventive apparatus can be formed for a radio link with a mobile phone according to bluetooth technology, the access authorization being stored in the mobile phone and the apparatus having access to the data of all access authorizations to check the access authorization stored in the mobile phones.

BRIEF DESCRIPTION OF THE DRAWINGS

In the following an embodiment of the inventive apparatus will be explained in more detail by way of example with reference to the drawing, in which.

DETAILED DESCRIPTION OF THE INVENTION

Figure 1:
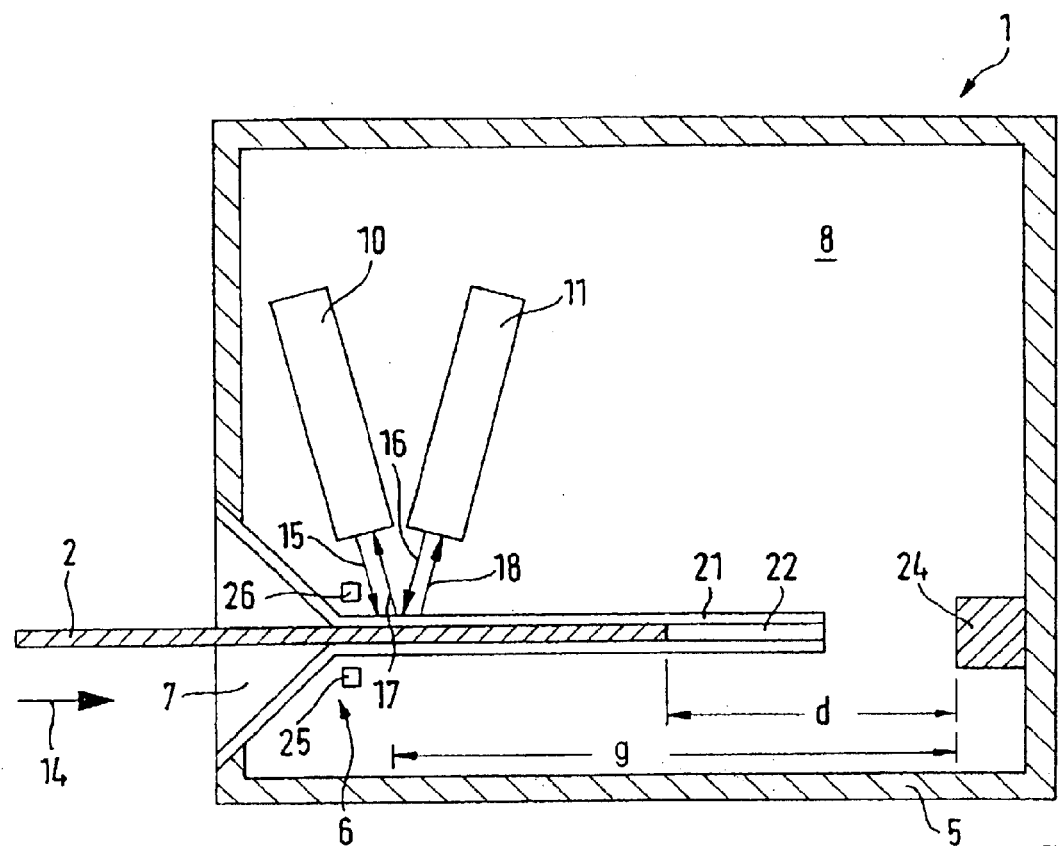
FIG. 1 shows schematically a longitudinal section through a card reader.
Figure 2:
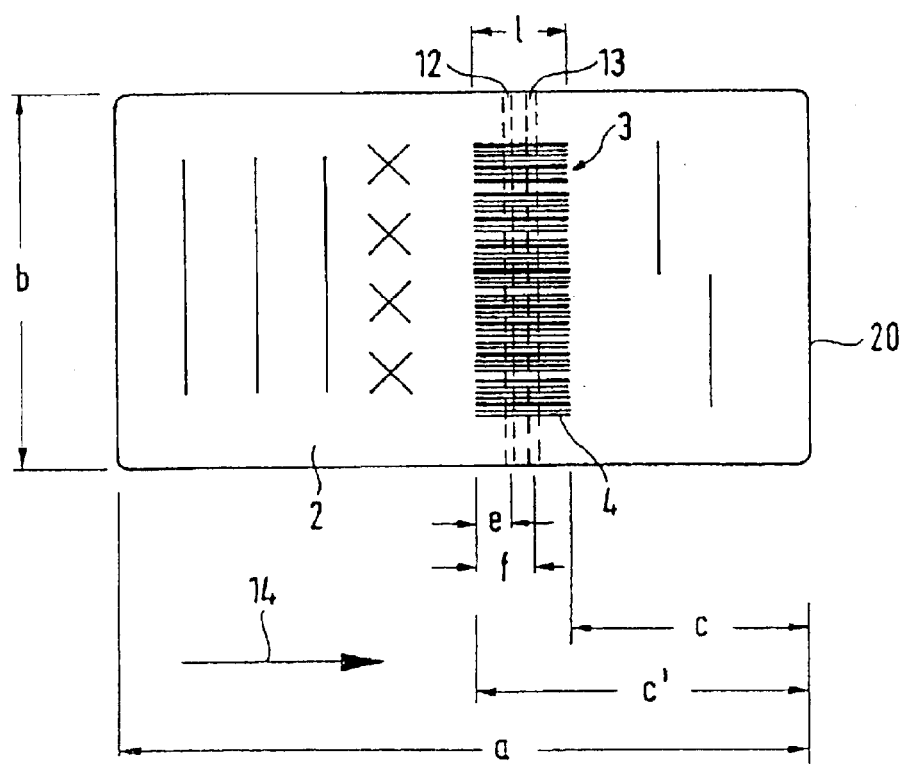
FIGS. 2 and 3 each show a plan view of the card inserted into the reader according to FIG. 1, with bar code fields at different distances from the card's leading edge.

Reading apparatus 1 is intended for reading authorization card 2 with field 3 with bar code 4. Apparatus 1 has housing 5 having insertion slot 6 on its front at the end of mouth 7 tapering in a funnel shape in cross section, card 2 being inserted into said slot in the longitudinal direction, i.e. insertion direction 14 corresponds to length a of card 2.

Two reading heads 10 and 11 are tandem mounted in interior space 8 of housing 5 directly behind insertion slot 6.

Front reading head 10 is formed for scanning bar code 4 in the visible region, and reading head 11 for scanning a bar code on card 2 in the IR region.

Reading heads 10 and 11 scan bar code 4 in lines 12 and 13, respectively, that extend perpendicular to insertion direction 14 of card 2. Each reading head 10, 11 can have for this purpose LEDs (not shown) as a light source, whose light falls onto bar code field 3 according to arrows 15, 16 as lines 12, 13. The light of scan lines 12, 13 is reflected according to arrows 17, 18 to an optoelectric transducer (not shown), for example a CCD line sensor, that extends across card 2 perpendicular to insertion direction 14. Connected to the optoelectric transducer is the usual evaluation electronics (not shown) of the reader. The width of each scan line 12, 13 is many times smaller than length l of bar code field 3 in insertion direction 14.

Reading heads 10, 11 can read cards with different formats, i.e. different lengths a and different widths b, and with bar code fields 3 with different distances c from leading edge 20 of card 2. Due to the different widths, cards from ISO to IATA format can thus be used.

For this purpose, bar code 4 is read according to the invention with reading heads 10, 11 during the motion upon insertion and/or removal of card 2 through slot 6 into or out of interior space 8.

This is permitted by the fact that interior space 8 is formed to be so long for insertion of card 2 that card 2 can be inserted further beyond the position shown in FIG. 1, namely by path d which—even with card 2 with greatest length a to be inserted—is greater than distance c' between leading edge 20 of card 2 and the end of bar code field 3 facing away from leading edge 20.

For guiding card 2 within housing 5, guide rails with receiving grooves can be provided, guide rail 21 being shown in FIG. 1 on one side with groove 22. Card 2 engages with its two longitudinal edges into longitudinal grooves 22 of guide rails 21.

To permit reading of cards with different widths b, insertion opening 6 has a width that corresponds to width b of widest bar code card 2 to be read with the apparatus. The bases of grooves 22 in guide rails 21 have the same distance on both sides of card 2.

Figure 3:
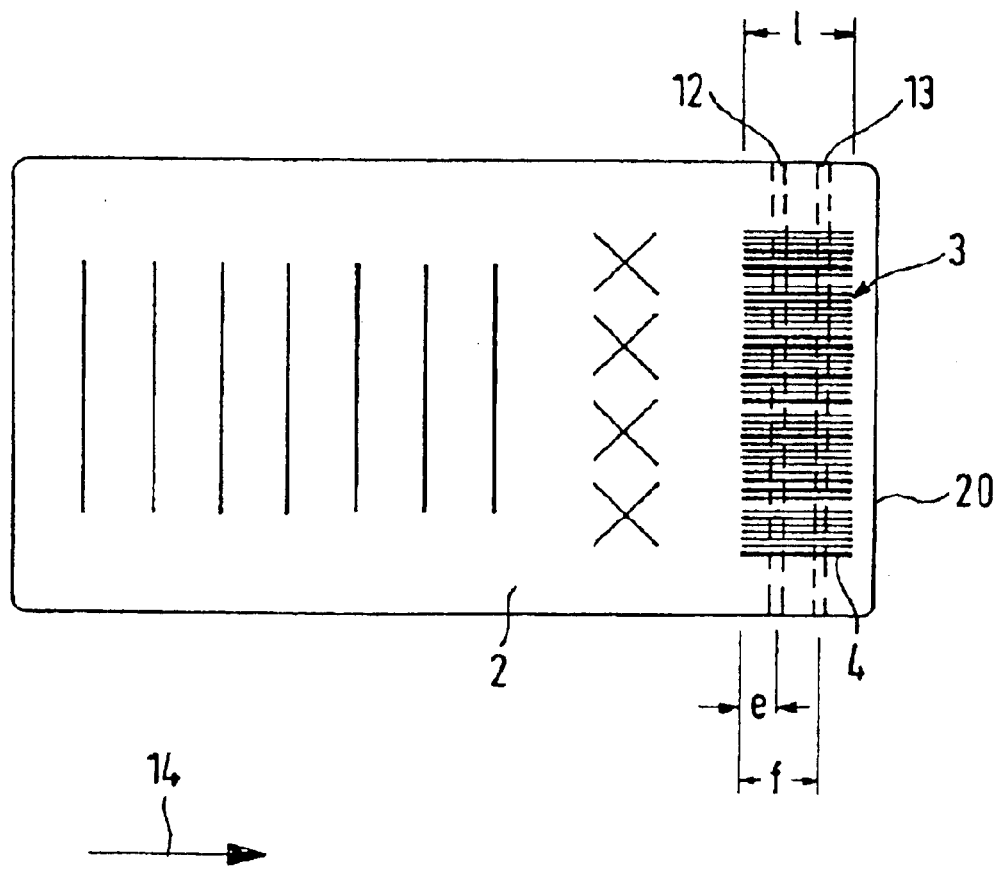

Distances e, f of scan lines 12, 13 of reading heads 10 and 11 from insertion slot 6 are less than length l of bar code field 3 in insertion direction 14. This permits reading of cards 2 in which bar code 4 is provided at great distance c from the card's leading edge 20. Moreover, cards 2 in which distance c is small or zero (FIG. 3) need to be inserted only a short distance into slot 6 for reading bar code 4. The distance between scan lines 12 and 13 should be as small as possible and preferably less than length 1 of bar code 4.

So that scan lines 12, 13 of reading heads 10, 11 ex tend as close as possible behind insertion slot 6, in particular rear IR reading head 11 is disposed obliquely, in such a way that its light beam 18, which is reflected by bar code 4 in scan line 13, is reflected obliquely rearward, i.e. away from insertion slot 6 to optoelectric transducer (not shown) of reading head 11.

Card 2 with small width b involves the danger of being inserted into insertion slot 6 so obliquely that scan lines 12, 13 no longer sweep total bar code field 3 and thus bar code field 3 is not scanned completely.

To prevent this, stop 24 is provided that extends perpendicular to card insertion direction 14. Card 2 is thus aligned in insertion direction 14 when leading edge 20 hits stop strip 24 over total width b. Bar code 4 can then be read completely at least upon removal of card 2. Stop 24 can be formed to be rigid, but also variably adjustable in card insertion direction 14.

To detect the width of card 2, a light barrier can be provided as indicated by light source 26 and photodiodes 25, which are disposed between insertion slot 6 and the scan lines of reading heads 10, 11.

What is claimed is:

1. An apparatus for reading authorization cards of different sizes that contain a field with a bar code extending in a first direction, comprising:
    a housing with a slot-shaped insertion opening for inserting a card with a bar code field into an interior space of the housing, the card being inserted into the insertion opening in a second direction perpendicular to the first direction of the bar code field, a width of the insertion opening corresponding to a width of the widest card to be read by the apparatus;
    a reading head within the interior space of the apparatus, in a region inwardly of and directly adjacent the insertion opening, for scanning the bar code in a line perpendicular to the second direction in which the card is inserted, the reading head comprising an optoelectric transducer that extends across the card in the first direction, and a light source configured to project light upon the bar code field as a line extending in the first direction; and
    a stop contained within the interior space of the apparatus at a first predetermined distance from the reading head and configured to limit a distance an inserted card can travel within the housing, as well as straighten an orientation of a card of sufficient length inserted in the housing, the first predetermined distance between the reading head and the stop being, for the longest card to be read by the apparatus, greater than a distance between a leading edge of the longest card and an edge of the bar code field upon the longest card that faces away from the leading edge of the longest card;
    wherein a card inserted lengthwise through the insertion opening into the interior space can be sufficiently displaced within the housing so that a leading edge of the inserted card extends beyond the scan line of the reading head by a distance less than or equal to the first predetermined distance between the reading head and the stop.

2. The apparatus according to claim 1, wherein a further reading head is disposed behind the reading head, one reading head scanning the bar code with visible light and the other reading head scanning the bar code with infrared light.

3. The apparatus according to claim 2, wherein the scan line of the reading head scanning with visible light and the scan line of the reading head scanning with infrared light have a distance apart that is smaller than the length of the bar code field in the insertion direction.

4. The apparatus according to claim 1, wherein the reading head is provided for scanning the bar co de both with visible light and with infrared light.

5. The apparatus according claim 1, wherein at least one further reading head for a visible region or IR region is disposed on the other side of a card guide.

6. The apparatus according to claim 1, wherein at least one mirror is disposed on one side of a card guide for deflecting the light from the light source to the reading head on the other side of the card guide.

7. The apparatus according to claim 1, wherein the stop is formed to be rigid or variably adjustable.

8. The apparatus according to claim 1, wherein a sensor is provided for detecting the length of the bar code field in the card insertion direction or the length of the bar code field perpendicular to the card insertion direction.

9. The apparatus according to claim 8, wherein at least one of the sensor detecting the length of the bar code field and the sensor detecting the width of the card is disposed between the insertion slot and the scan line of the reading head.

10. The apparatus according to claim 1, wherein a sensor is provided for detecting the width of the card.

11. The apparatus according to claim 1, wherein a sensor is provided between the insertion slot and the scan line of the reading head for detecting the leading edge of the inserted card and switching on the reading head when the card is detected.

12. An apparatus for reading authorization cards of varying sizes having a bar code printed thereon, comprising:
    a housing with a slot-shaped insertion opening for passing a card at least partially into an interior of the housing, the insertion opening having a width corresponding to a width of the widest card to be read by the apparatus;
    a card guide contained within the interior of the housing for guiding the movement of a card at least partially inserted into the interior of the housing;
    a reading head within the interior of the apparatus for reading the bar code upon a card, the reading head being configured to scan a transverse region of a card that has been inserted into the interior of the apparatus, the transverse region being positioned inwardly of and directly adjacent to the insertion opening and extending generally parallel to the insertion opening to permit reading of the bar code;
    a stopping mechanism contained within the interior of the apparatus at a predetermined distance from the scan region of the reading head and configured to adjust an orientation of an inserted card so that a leading edge of the card is oriented perpendicularly to the direction of insertion of the card into and the apparatus;
    wherein the predetermined distance between the stopping mechanism and scan region of the reading head is greater than a distance between the leading edge of a card and trailing edge of the bar code of the card for the longest card to be read by the apparatus.

13. The apparatus according to claim 12 wherein the reading head comprises a light source and a charge coupled device (CCD) line sensor disposed in an area of the interior of the apparatus adjacent the insertion opening.

* * * * *

UNITED STATES PATENT AND TRADEMARK OFFICE
CERTIFICATE OF CORRECTION

PATENT NO. : 6,896,187 B2
DATED : May 24, 2005
INVENTOR(S) : Rudolf Stockhammer

It is certified that error appears in the above-identified patent and that said Letters Patent is hereby corrected as shown below:

Column 6,
Line 19, change "co de" to -- code --.
Line 62, change "12" to -- 12, --.

Signed and Sealed this

Eleventh Day of October, 2005

JON W. DUDAS
*Director of the United States Patent and Trademark Office*